May 27, 1952   R. S. PLEXICO   2,598,428
REMOTE CONTROL OF TRANSMISSION
Filed July 26, 1946   3 Sheets-Sheet 1
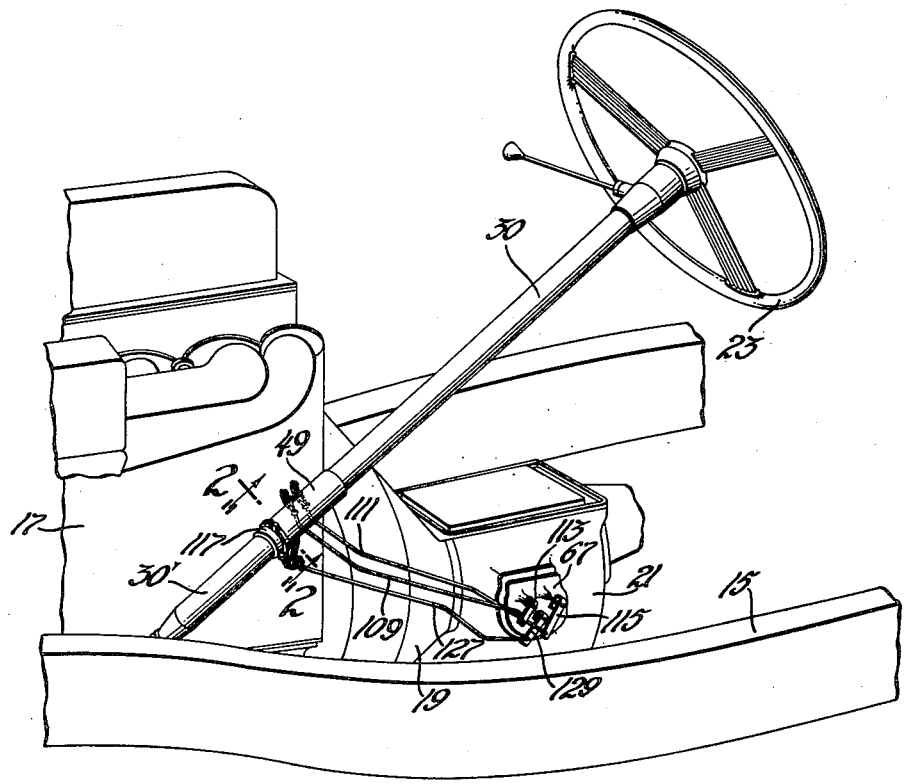
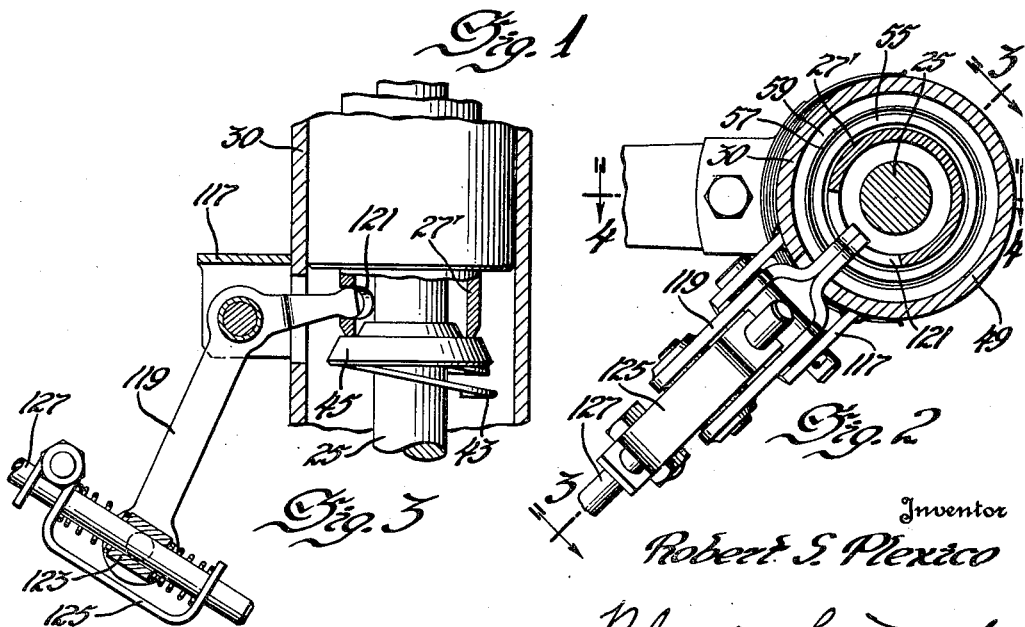

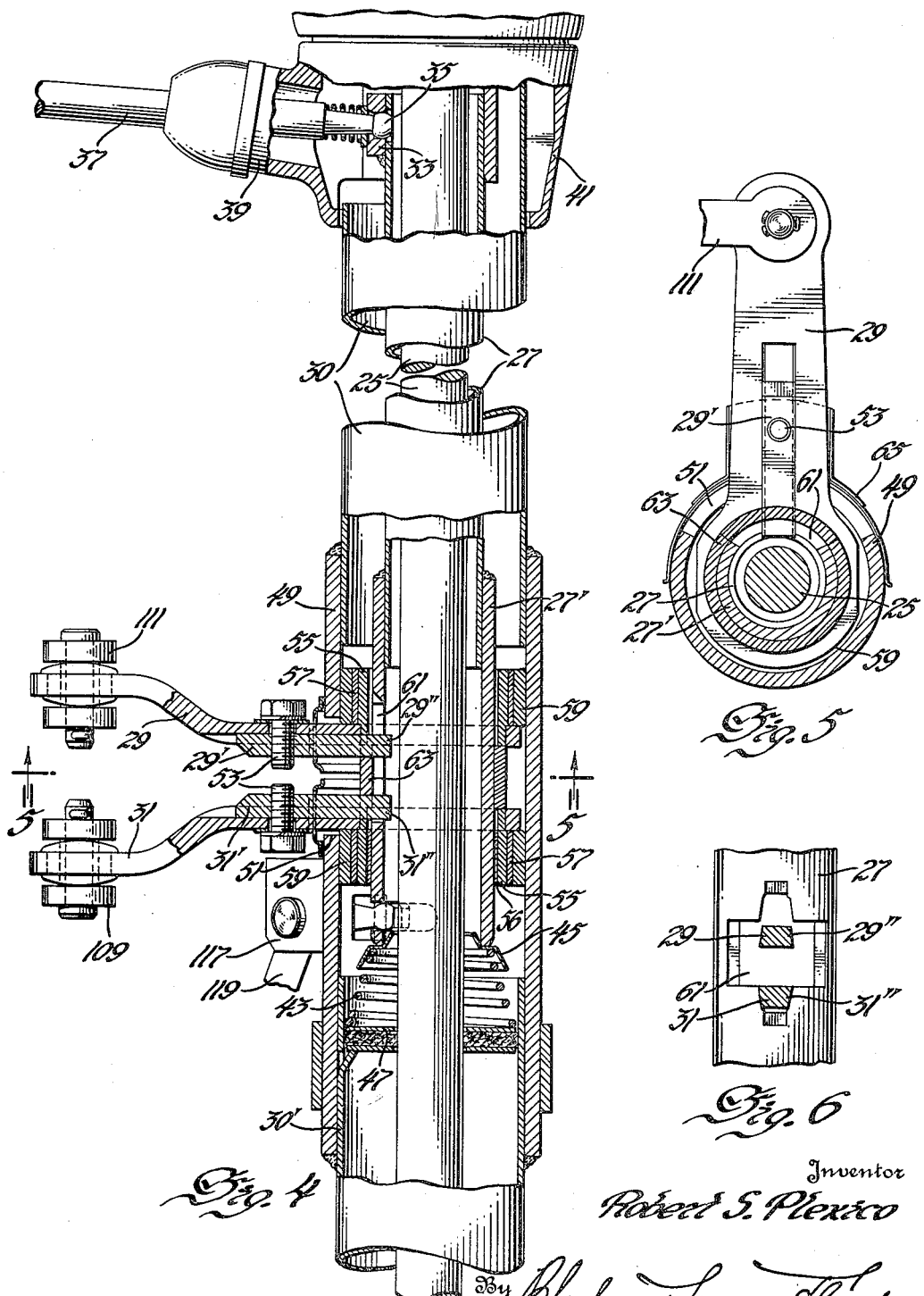

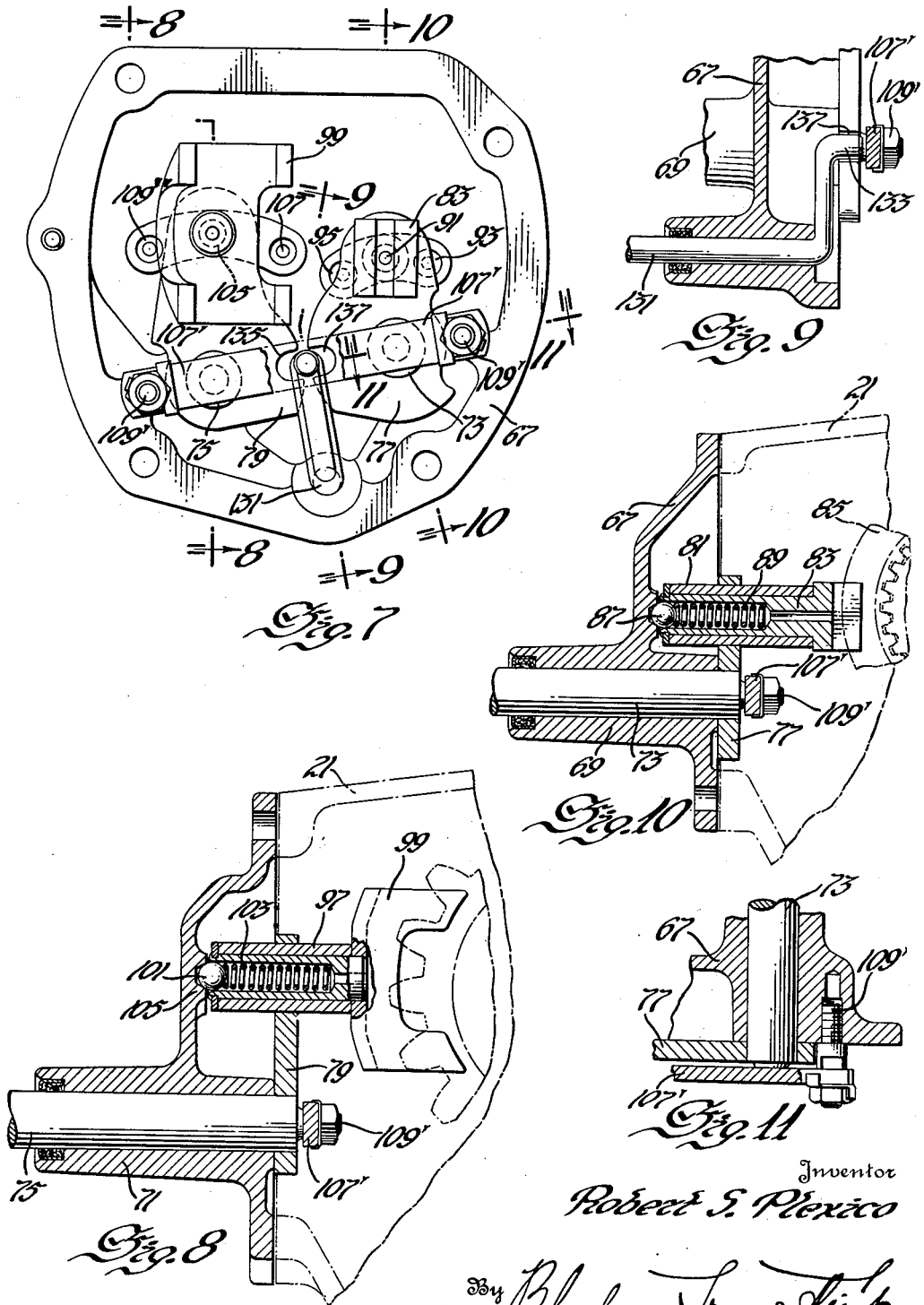

Patented May 27, 1952

2,598,428

UNITED STATES PATENT OFFICE 2,598,428

REMOTE CONTROL OF TRANSMISSION

Robert S. Plexico, Royal Oak, Mich., assignor to General Motors Corporation, Detroit, Mich., a corporation of Delaware Application July 26, 1946, Serial No. 686,309

9 Claims. (Cl. 74—477)

This invention is concerned with the change speed mechanism of a motor vehicle and involves an improvement in the mechanism by which a manually operable lever adjacent the steering wheel effects driving ratio changes.

A primary object of the invention is to improve the interlock means, so called, the means by which the gearing through which one pair of driving ratios operates, is locked out or rendered positively inoperative when the parts are moved to select for operation the gearing for driving another pair of driving ratios. The invention, too, includes a provision for carrying out the major object by the use of a tube within the steering mast or jacket and surrounding and concentric with the steering shaft.

Other objects and advantages will be understood from the description which follows.

On the accompanying drawings:

Fig. 1 is a perspective of the novel invention showing the relation to the parts of the vehicle.

Fig. 2 is a section on line 2—2 of Fig. 1.

Fig. 3 is a section on line 3—3 of Fig. 2.

Fig. 4 is a longitudinal section through the steering jacket the section being indicated by line 4—4 of Fig. 2.

Fig. 5 is a section on line 5—5 of Fig. 4.

Fig. 6 is a detail in elevation with parts in section.

Fig. 7 is a view in elevation of the inside of the gear housing cover.

Figures 8, 9, 10 and 11 are sections on lines marked 8—8, 9—9, 10—10 and 11—11 respectively on Fig. 7.

On Fig. 1 the vehicle frame is marked by numeral 15. On the frame is mounted the engine 17, the clutch housing 19 and the gear box or change speed transmission housing 21, within which housing is the gearing by which the engine drives the vehicle at a plurality of selected ratios. The steering wheel 23 rotates a steering shaft to be seen at 25 on Fig. 4. Within the steering jacket 30 is a tubular shaft 27 which shaft surrounds and is concentric with the steering shaft 25. It is this shaft 27 which is to be clutched to one or the other of two levers 29 or 31 by a movement of reciprocation and in a way to be explained. A subsequent rotation of shaft 27 and the clutched lever serves to shift the gearing elements to effect a driving position for two ratios depending upon the direction of rotation of the shaft and lever.

At the upper end of shaft 27 is a reinforcement 33 to receive the ball end 35 of a lever 37. The lever is fulcrumed in a lateral extension 39 of a housing 41 itself rotatable about the jacket 30. The housing 41 is mounted in any convenient way so that it may rotate on its axis but may not reciprocate. Therefore the lever 37 may be moved up about its fulcrum within the extension 39 and push the shaft 27 down. In moving it down it overcomes a spring 43 seated in a cup 45 at the lower end of shaft 27', an extension of shaft 27, and at its other end against an abutment 47 carried by the fixed column or jacket extension 30'. When the lifting effort on lever 37 is released the spring 43 is available to raise the shaft 27.

The adjacent ends of jacket members 30 and 30' are connected by a larger tubular member 49 through an arcuate opening 51 through which the levers 29 and 31 extend. Each lever has an inner extension 29' and 31' the parts being secured together by fastening means 53. The levers 29 have tubular hubs 55 surrounding the control shaft extension 27' with clearance space between the shaft extension and the upper hub and a guide bushing 56 in the lower lever hub for the shaft extension. Bushings 57 are located between the hubs and sleeves 59 secured to the jacket 49. The inner ends of parts 29' and 31' are trapezoidal in shape as shown at 29'' and 31'' in Fig. 6. These ends are located in an opening 61 of shaft extension 27', the opening being shown in Fig. 6 as having upper and lower trapezoidal parts to receive one or the other of the lever ends 29'' and 31'' when the shaft 27, 27' is reciprocated. To space the levers there is a spacing member 63. To prevent the entrance of foreign matter through opening 51 there may be provided guards 65.

From the above description and an inspection of the drawing it will be understood that shaft 27 is normally held upwardly by spring 43 in which position lever 31 is clutched to the shaft because its end 31'' is in the notch at the lower end of the opening 51 as shown by Fig. 6. Rotation of the hand lever about the central axis of the jacket then rotates shaft 27 and lever 31. The connections from lever 31 to the gear housing are such that certain members are moved to position the parts for driving in direct or high speed or in second speed depending upon the direction of rotation of shaft 27. If the hand lever is lifted the shaft 27 is pushed down against the resistance of spring 43, lever end 31'' enters the large part of the opening 61, and lever end 29'' enters the upper notch whereupon rotation of hand lever operates through lever 29 to move parts in the gear housing to effect low speed or reverse depending upon the direction of rotation.

Figures 7 to 11 inclusive, show the provision for ratio changing in the gear housing as a result of rotating levers 29 and 31 above mentioned. The housing 21 has a side wall cover 67. The cover has bosses 69 and 71 for rockshafts 73 and 75. Shaft 73 carries an arm 77. Shaft 75 has an arm 79. Arm 77 has secured thereto a tubular member 81 within which is rotatably supported the shank of a fork 83, the fork being bifurcated to embrace a sliding gear 85. The shank is bored to receive a ball 87 backed by a spring 89 and the ball engages any one of three pockets 91, 93 and 95 in the cover 67, 91 in its mean or neutral position and 93 and 95 in its extreme positions, wherein the gear 85 is moved for driving in second or high speed. Similarly arm 79 is equipped with a sleeve 97 rotatably carrying the shank of a fork 99 there being in that shank a detent ball 101 and spring 103, the ball entering a neutral recess 105 or end recess 107 and 109" in the cover. It will be readily seen that the shafts 73 and 75 are held from outward movement by their arms 77 and 79. To hold them from inward movement a bar 107' is secured at its ends to the cover at 109', the ends of the rockshafts being adapted to engage the bar in the event the shafts move inwardly. To rock the shafts 73 and 75 and move the gear elements, links 109 and 111 connect levers 31 and 29 to levers 113 and 115 respectively.

It is obviously necessary that the two arms 77 and 79 should not be rotated at one and the same time from the neutral position shown in Fig. 7. In some prior devices of this general kind it has been proposed to add a locking device to hold either one of these parts in response to the first part of the movement of the other. To make sure that no joint movement shall occur as it might during the first part of the lever movement, I prefer to use a positive locking device operable not by one of the members 77 or 79 but independently thereof and during the period of selecting which of the shafts 73 or 75 is to be rocked. To that end I pivot to a bracket 117 clamped to the jacket member 49 a bell crank 119. The bell crank has one end projecting into an arcuate slot 121 (see Fig. 2) in the control shaft extension 27'. The other end of the bell crank is pinned to a block 123 between springs in abutment at their remote ends with the arms of a U-shaped member 125 secured to a rod 127. The rod extends to the gear housing where it is connected to a lever 129 on a rockshaft 131 terminating within the cover in a cranked end 133 adapted to enter the one or the other of notches 135, 137 in the lever arms 79 and 77. Fig. 7 shows the crank arm in its intermediate position. It will be understood that with the parts in the positions shown by Fig. 4 the spring 43 is holding the control shaft 27 upwardly with lever 31 in operating position as in Fig. 6. Under these circumstances the bell crank will occupy a position such that its link 127 will so hold the lever 129 and shaft 131 that the cranked end 133 is engaged with notch 135, and not in neutral as shown by Fig. 7. Thereafter rotation of shaft 27 will rock lever 31 which through its connections, will shift the gear 85 into its several positions for effecting high speed, neutral or second speed.

To get low speed or reverse the central shaft 27 is depressed. It cannot depress until the notch 137 is in registration with 135 because the cranked end lies closely adjacent the surface of the arm 77. When in registration the gearing is in neutral. The control shaft may then be lowered and simultaneously with its downward movement, and before any movement of shifting is undertaken, the lever arm 77 is locked. The downward movement also clutches lever 29 and releases lever 31 so that thereafter rotation of control shaft 27 operates to make shifts into low or reverse depending upon the direction of rotation.

In connection with the locking of lever arms 77 and 79 it will be noted that the upper and lower edges of the opening 61 cooperate with the lever arm ends 29" and 31" when the control shaft is turned from its neutral position and preclude axial travel of the control shaft out of engagement with the selected lever. This will be best apparent upon inspection of Figure 6 where it will be seen that with the parts set as shown a rotation of the control shaft 27 will swing with it the lever 31 to the right or to the left, as the case may be, whereupon the upper edge of the opening 61 overlaps the upper surface of the arm 29 and thereupon blocks depression of the control shaft and keeps the crank 133 in the notch 135. Similarly, when the control shaft 27 has been depressed in the neutral position to release the arm 31 and couple to the arm 29 and is then rocked in either direction the lower edge of the opening 61 comes under the arm 31 which blocks upward retraction of the control shaft and retains the crank 133 in the notch 137. Its subsequent return to neutral enables the force of the spring 43 automatically to bias the control shaft into the aforementioned normal clutched engagement with the control arm 31.

I claim:

1. In remote control for changing the driving ratio of a transmission mechanism of a vehicle having a steering jacket, a manually operable lever adjacent the upper end of said steering jacket, first and second levers adjacent the lower end of said jacket, an independent connecting link from each of said levers to said transmission mechanism for shifting into different ratio groups, a rockshaft and a pair of ratio-shifter arms included in said transmission, an interlocking device in said transmission for locking out one of said groups by interference with the motion of said arms, a third lever adjacent the lower end of said steering jacket and a third link connecting said third lever and said device, an element operable by reciprocation and in response to movement of said manually operated lever to engage the first or second lever and simultaneously to operate said third lever, said element thereafter adapted to rotate and rock the selected lower lever.

2. In remote control for changing the driving ratio of a motor vehicle, a transmission housing, first and second movable members therein operative to effect a plurality of driving ratios, an interlocking device in said housing to lock one of said members and free the other, first and second remotely located shift actuating levers, a shifter head mechanism embodying a tube having intersecting motion with respect to said levers, linkage between said remotely located shift actuating levers and said first and second movable members for transmitting shift actuation force to said members, a third remotely located lever independently opearble by said tube, linkage between said last named lever and said interlocking device, and manually operable means effective to cause said tube to clutch for operation one of the first or second remote levers and simultaneous to operate said third lever, its linkage and the interlocking device.

3. The invention defined by claim 2, said motor vehicle having a steering jacket, a reciprocable and rotatable shaft included in said manually operable means said three remote levers being adjacent the lower end of said jacket, and an operating lever adjacent the upper end of said jacket and arranged for operation such that reciprocation of said shaft selects between said first and second movable members thru the agency of said independent tube element and locks out the unselected member and rotationally positions the selected member for the desired driving ratio.

4. In a motor vehicle equipped with remote controls for a transmission assembly, a steering support for said vehicle, a transmission shifter head mechanism supported by the said steering support having a manually operable hand lever as a first action means and having a rotatable and axially movable tube as a second action means moved by said lever, a step-gear transmission assembly embodying shifter devices to mesh and demesh selected gear elements of said assembly said elements being arranged in pairs, and an interlock mechanism within said assembly including a separate operator for said interlock mechanism effective to lock out of action one pair of driving ratios of said gear elements or a second pair thereof selectively by coaction with said devices, individually operable levers selectively engaged by the motion of said tube for selective operation of one of said pairs of gear elements, shifter means included in said devices within said assembly and operative to provide selective motion of said pairs, individual connecting rods joining each of said individually operable levers to said shifter means for transmitting shifter action thereto from said tube and handlever to said pairs, and a separate rod movable by said tube and effective to operate said interlock mechanism operator.

5. In the combination set forth in claim 4, the sub-combination of an arm of said shifter means, of a spring-pressed detent carried by said arm, of a casing and cover for said assembly, and of pockets formed within the said cover at predetermined positions of registry for said arm and detent which positions correspond to in-gear positioning of said shifter means.

6. In the combination set forth in claim 4, the sub-combination of an arm of said shifter means having a tubular part surrounding a hollow tubular stem containing a detent spring pressing against a detent, of a casing and cover for said assembly, and of detent registry pockets formed inside the said cover.

7. The invention defined by claim 4, in which the said shifter devices include rockshafts operated by said connecting rods thru two arms moved by said rods, position-determining lugs on said individually operable levers, an aperture of said tube adapted to engage said lugs at motion-limit stations of said tube, and of a detent of said shifter means effective to correlate the motion of said first action means handlever with the motion of said rockshaft.

8. In a change speed transmission, a housing, a cover for same, a first rockshaft rotatably carried by the cover and protruding therefrom, an arm carried by said rockshaft located within said housing, shifting means carried by said arm, a spring-pressed detent carried by said means, detent pockets formed in said cover for registry positioning of said detent, a second rockshaft having an inner arm, shifter mechanism operated thereby including a second spring-pressed detent for holding said second rockshaft arm, and a third rockshaft journaled in said cover having an inner arm adapted to selectively engage and lock the arm of one of said first or second rockshafts and to hold same from rotation.

9. In a change speed transmission, a housing a plurality of movable gear-changing means within said housing arranged to change the driving ratio of said transmission, an interlocking detent adapted to engage selectively one of said movable means, operating mechanism remote from said housing for selecting one of said movable means and for operating same to provide a desired drive ratio, a linkage means joining said gear-changing means with said mechanism including a pair of connectors operable individually to move said gear-changing means, both of said connectors extending from said remote operating mechanism to said gear-changing means, and a separate connection between said operating mechanism and said interlock detent effective to lock against movement one of said gear-changing means while permitting drive ratio change thereof by the operating action of said mechanism.

ROBERT S. PLEXICO.

REFERENCES CITED

The following references are of record in the file of this patent:

UNITED STATES PATENTS

| Number | Name | Date |
|---|---|---|
| 1,742,749 | Bock et al. | Jan. 7, 1930 |
| 1,774,026 | Manville | Aug. 26, 1930 |
| 2,193,218 | Best | Mar. 12, 1940 |
| 2,292,325 | Lawler | Aug. 4, 1942 |
| 2,299,889 | Fishburn | Oct. 27, 1942 |
| 2,324,732 | Slack | July 20, 1943 |
| 2,522,321 | Wahlberg | Sept. 12, 1950 |